United States Patent
Kishimoto (10) Patent No.: US 10,643,095 B2
(45) Date of Patent: May 5, 2020

(54) INFORMATION PROCESSING APPARATUS, PROGRAM, AND INFORMATION PROCESSING METHOD

(71) Applicant: CANON KABUSHIKI KAISHA, Tokyo (JP)

(72) Inventor: Ryo Kishimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 16/014,915

(22) Filed: Jun. 21, 2018

(65) Prior Publication Data

US 2019/0005347 A1    Jan. 3, 2019

(30) Foreign Application Priority Data

Jun. 29, 2017  (JP) ................................ 2017-128037

(51) Int. Cl.
  *G06K 9/46* (2006.01)
  *G06K 9/00* (2006.01)
  *G06K 9/36* (2006.01)
(52) U.S. Cl.
  CPC .......... *G06K 9/46* (2013.01); *G06K 9/00442* (2013.01); *G06K 9/00449* (2013.01); *G06K 9/00463* (2013.01); *G06K 9/36* (2013.01); *G06K 2009/363* (2013.01)
(58) Field of Classification Search
  CPC ........ G06K 9/46; G06K 9/36; G06K 9/00442; G06K 9/00449; G06K 9/00463; G06K 2009/363
  See application file for complete search history.

(56) References Cited

U.S. PATENT DOCUMENTS

| 8,184,155 | B2 | 5/2012 | Ke et al. | |
| 2011/0129154 | A1* | 6/2011 | Shimodaira | G06T 7/80 382/190 |
| 2016/0093058 | A1* | 3/2016 | Moteki | G06T 7/73 382/154 |
| 2018/0089533 | A1* | 3/2018 | Zagaynov | G06K 9/4671 |

\* cited by examiner

*Primary Examiner* — Phuoc Tran
(74) *Attorney, Agent, or Firm* — Canon U.S.A., Inc. I.P. Division (57) ABSTRACT

First coordinate transformation information between an entire image and a first captured image is calculated by a feature point comparing process. Second coordinate transformation information between the first captured image and a second captured image is calculated by a feature point tracing process, the second captured image being a captured image at a timing when the first coordinate transformation information is calculated. Third coordinate transformation information between an immediately previous captured image and a third captured image is calculated by a feature point tracing process. A data input area in the entire image is mapped on the third captured image based on the first to the third coordinate transformation information pieces. Updates of the first and the second coordinate transformation information pieces may be suppressed where a change amount exceeds a predetermined threshold.

7 Claims, 10 Drawing Sheets

ORDER SHEET

ORDER NO.     ORDER DATA   JULY 1ST, 2017

NAME OF ORDERING COMPANY   XYZ CORPORATION
ADDRESS   1 – 111 ZZZ, YYY CITY, XXX PREFECTURE
080-1234-1234

PERSON IN CHARGE   DAIJIRO SUZUKI

WE ORDER THE FOLLOWING.

| MODEL NAME | PRODUCT NAME | QUANTITY | TIME OF DELIVERY |
|---|---|---|---|
| 2801119 | INK TANK, COLOR CYAN | 3 | JULY 3RD |
| 3801120 | INK TANK, COLOR BLACK | 3 | JULY 3RD |
| 4801121 | INK TANK, COLOR MAGENTA | 3 | JULY 3RD |
|  |  |  |  |
|  |  |  |  |
|  |  |  |  |

DELIVERY DESTINATION

| NAME OF DESTINATION COMPANY   ABC CORPORATION ||
|---|---|
| DIVISION NAME   GENERAL AFFAIRS DIVISION | PERSON IN CHARGE   TARO YAMADA |
| ADDRESS OF DELIVERY DESTINATION   1–111 CCC, BBB CITY, AAA PREFECTURE ||
| PHONE NO.   222-22-2222 | FAX NO.   111-111-1111 |

| ID | KEY | POINT | WIDTH | HEIGHT |
|---|---|---|---|---|
| 1 | PRODUCT NAME 1 | (100, 300) | 100 | 15 |
| 2 | PRODUCT NAME 2 | (100, 320) | 100 | 15 |
| 3 | PRODUCT NAME 3 | (100, 340) | 100 | 15 |
| 4 | QUANTITY 1 | (220, 300) | 35 | 15 |
| 5 | QUANTITY 2 | (220, 320) | 35 | 15 |
| 6 | QUANTITY 3 | (220, 340) | 35 | 15 |

602 – row 1
603 – row 2
604 – row 3
605 – row 4
606 – row 5
607 – row 6

500

ORDER SHEET

ORDER NO.     ORDER DATA   JULY 1ST, 2017

NAME OF ORDERING COMPANY   XYZ CORPORATION
ADDRESS   1 – 111 ZZZ, YYY CITY, XXX PREFECTURE
            080-1234-1234
PERSON IN CHARGE   DAIJIRO SUZUKI
WE ORDER THE FOLLOWING.

| MODEL NAME | PRODUCT NAME | QUANTITY | TIME OF DELIVERY |
|---|---|---|---|
| 2801119 | INK TANK, COLOR CYAN | 3 | JULY 3RD |
| 3801120 | INK TANK, COLOR BLACK | 3 | JULY 3RD |
| 4801121 | INK TANK, COLOR MAGENTA | 3 | JULY 3RD |
|  |  |  |  |
|  |  |  |  |
|  |  |  |  |
|  |  |  |  |

608, 609, 610 – rows of the table
611, 612, 613 – quantity/delivery entries

DELIVERY DESTINATION

| NAME OF DESTINATION COMPANY   ABC CORPORATION ||
|---|---|
| DIVISION NAME   GENERAL AFFAIRS DIVISION | PERSON IN CHARGE   TARO YAMADA |
| ADDRESS OF DELIVERY DESTINATION   1 – 111 CCC, BBB CITY, AAA PREFECTURE ||
| PHONE NO.   222-22-2222 | FAX NO.   111-111-1111 |

INFORMATION PROCESSING APPARATUS, PROGRAM, AND INFORMATION PROCESSING METHOD

BACKGROUND OF THE INVENTION

Field of the Invention

The present invention relates to tracking processing.

Description of the Related Art

Mobile terminals with cameras have become common. Conventionally, users use scanners and the like to read paper documents as image data pieces, however, image data pieces of paper documents can be easily obtained by capturing images using cameras of mobile terminals. U.S. Pat. No. 8,184,155 describes a technique for recognizing and tracking a display area and coordinates of an electronic document obtained using a camera.

SUMMARY OF THE INVENTION

An information processing apparatus according to the present invention includes a processor and a memory that stores instructions, wherein the processor executes the instructions to perform feature point comparison processing for comparing a feature point extracted from an entire image prepared in advance and a feature point extracted from a first captured image, calculating first transformation information used for coordinate transformation between a coordinate system of the entire image and a coordinate system of the first captured image, feature point trace processing for tracing a position of a feature point in a second captured image when the first transformation information is calculated based on the feature point extracted from the first captured image, calculating second transformation information used for coordinate transformation between the coordinate system of the first captured image and a coordinate system of the second captured image, feature point trace processing for tracing a position of a feature point in a third captured image based on a feature point extracted from a captured image immediately previous to the third captured image, calculating third transformation information used for coordinate transformation between a coordinate system of the immediately previous captured image and a coordinate system of the third captured image, mapping a data input area in the entire image on the third captured image based on the first transformation information, the second transformation information, and the third transformation information, and control to suppress update of the calculated first transformation information and update of the calculated second transformation information in a case where a change amount of a captured image is greater than a predetermined threshold value.

Further features of the present invention will become apparent from the following description of exemplary embodiments with reference to the attached drawings.

DESCRIPTION OF THE EMBODIMENTS

According to the present specification, a configuration is described which obtains and uses optical character recognition (OCR) result information about a local area in an image of a paper document captured by a camera. When OCR result information is obtained, if position coordinates of an area in which information of an obtaining target is included (a data input area) is already known (for example, a business form in a known format), an area of an OCR processing target can be identified, and the OCR result can be obtained by performing OCR processing on the area. In the case of a relatively small object, such as a business card and a license, an image having sufficient resolution for OCR can be obtained when an image of the entire subject is captured. On the other hand, in the case of a paper document having a relatively large size, such as A4 and A3, obtainment accuracy of OCR result information is deteriorated when OCR processing is performed using an image capturing an entire document. This is because a distance between an object and a camera becomes larger, thus resolution of an OCR processing target area is lowered, and details in a captured image may be likely to be out of focus. Thus, to improve the obtainment accuracy of OCR result information it would be necessary to capture an enlarged image by approaching a target area even in the case of a paper document having a relatively large size, such as A4 and A3. When an image of a business form in a known format is captured, if a current image capturing range of the business form can be identified, an OCR processing target area (a data input area) can be identified based on a relative positional relationship, and thus an image of the target area may be enlarged and captured. Thus, the present applicant discusses a technique for first identifying an OCR processing target area by capturing an entire document image and performing guide display of an area of an image capturing target by highlighting a portion of the target area with a red frame and the like so as to prompt a user to enlarge and capture an image of the identified target area. The present applicant further discusses a technique for continuing the guide display by tracking and highlighting the area while the user performs an operation for gradually bringing the camera close to the OCR processing target area of the document after the entire document image is captured. Guiding an area to be enlarged and captured enables a user to avoid enlarging and capturing an image of a useless portion and to obtain an OCR result by efficiently capturing an image.

On the other hand, a processing load is high in processing for identifying a current image capturing range of the business form being captured by comparing a feature point of a captured image and a feature point of the entire business form in the known format, so that it is difficult to perform the processing on all frames in a captured moving image. Thus, a technique can be considered in which an initial image capturing range is identified first by feature point comparison processing for comparing a feature point of a captured image and a feature point of the entire business form in the known format, and then tracking of the image capturing range and the OCR processing target area is performed by executing feature point trace processing for tracing a moving amount of the feature point between frames in a moving image. U.S. Pat. No. 8,184,155 describes a method for recognizing and tracking a display area and a location of an electronic document using an invisible junction feature amount and further describes that once identification of the display area and the location is performed by the invisible junction feature amount, the feature point is traced between video frames, and a planer movement (projective transformation) between the video frames is estimated.

However, when it is configured to perform tracking an image capturing range and an OCR processing target area by tracing a feature point between frames of a moving image, errors in the feature point trace processing between frames are gradually accumulated, and a positional deviation of the target area becomes large. When OCR processing is applied to the area in a state in which a position of the OCR processing target area is deviated by accumulation of tracking error, information originally required may be protruded from the target area and not be recognized. Thus, a positional deviation caused by accumulation of tracking error is regularly corrected. Therefore, the present applicant discusses correction of a positional deviation by regularly executing feature point comparison processing for comparing a feature point of a frame image being captured and a feature point of the entire business form in the known format to regularly identify a current image capturing range again. However, feature point comparison processing takes a processing time, and there is an issue that if the feature point comparison processing is performed when a camera is largely moved, a difference becomes large between an image of a frame used in the feature point comparison processing and an image of a frame being captured when the comparison result is obtained, and tracking processing becomes easily failed since the feature point trace processing between frames cannot be performed.

A mobile terminal with a camera function is described below as an example of an information processing apparatus for solving the above-described issue.

Figure 1:
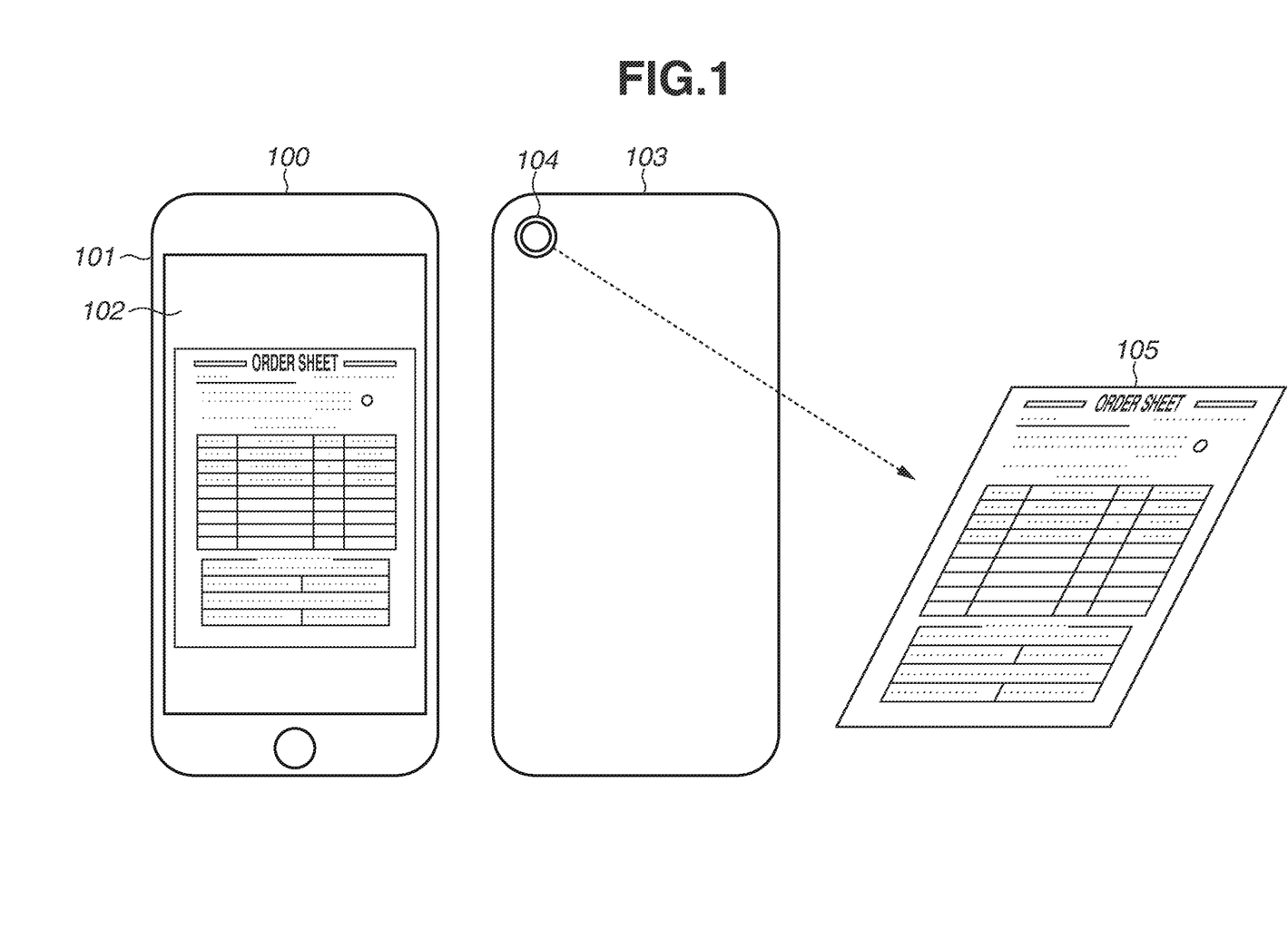
FIG. 1 illustrates an example of an external appearance of a mobile terminal.

FIG. 1 illustrates an example of an external appearance of a mobile terminal. A mobile terminal 100 is constituted of various units (101 to 104). A touch panel 102 is installed in a front portion 101 of the mobile terminal 100. The touch panel 102 has a function as a display (display unit) for displaying information such as an image (a moving image) and a function as an input unit for inputting an instruction in response to a touch operation by a user. A rear portion 103 of the mobile terminal 100 includes a camera 104 for obtaining a captured image by capturing an image of an object 105 such as a paper document. A user of the mobile terminal 100 starts a mobile application described below, captures an image of the object 105 using the camera 104, and thus can start processing. The object 105 in FIG. 1 is an order sheet which is an A4 size paper document. The object 105 can include business cards, pictures, and cards of various sizes without being limited to paper documents. The mobile application described below can obtain an image of the object 105 using the camera 104 and display the image on the touch panel 102.

Figure 2:
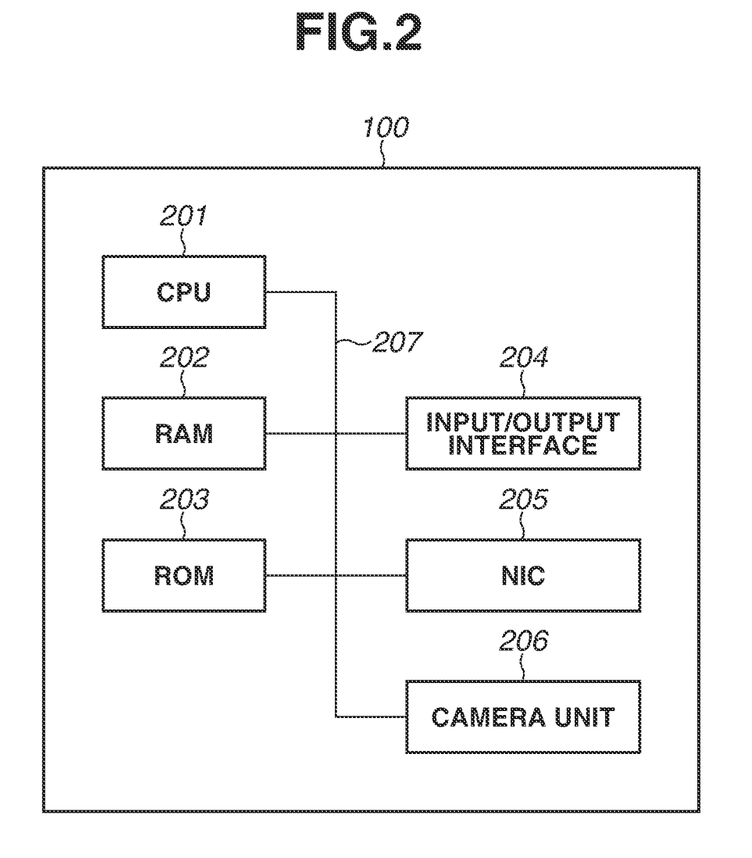
FIG. 2 illustrates an example of a hardware configuration of the mobile terminal.

FIG. 2 illustrates an example of a hardware configuration of the mobile terminal 100. The mobile terminal 100 is constituted of various units (201 to 207). A central processing unit (CPU) 201 is a unit for executing various programs and realizing various functions. A random access memory (RAM) 202 is a unit for storing various information pieces. The RAM 202 is further used as a temporary working and storage area of the CPU 201. A read-only memory (ROM) 203 is a storage medium for storing various programs and the like. The ROM 203 may be a storage medium such as a flash memory, a solid state disk (SSD), and a hard disk drive (HDD). The CPU 201 loads a program stored in the ROM 203 to the RAM 202 and executes the program. Accordingly, the CPU 201 functions as each processing unit of the mobile application illustrated in FIG. 3 and executes processing in each step in sequences described below. Whole or a part of the function of each processing unit of the mobile application and the processing according to the below-described sequences may be realized not only by the CPU 201 but also by using a dedicated hardware.

An Input/Output interface 204 transmits and receives data to and from the touch panel 102. A network interface card (NIC) 205 is a unit for connecting the mobile terminal 100 to a network (not illustrated). A camera unit 206 is connected to the camera 104 and obtains an image of the object 105 to the mobile terminal 100. Each of the above-described units can transmit and receive data via a bus 207.

Figure 3:
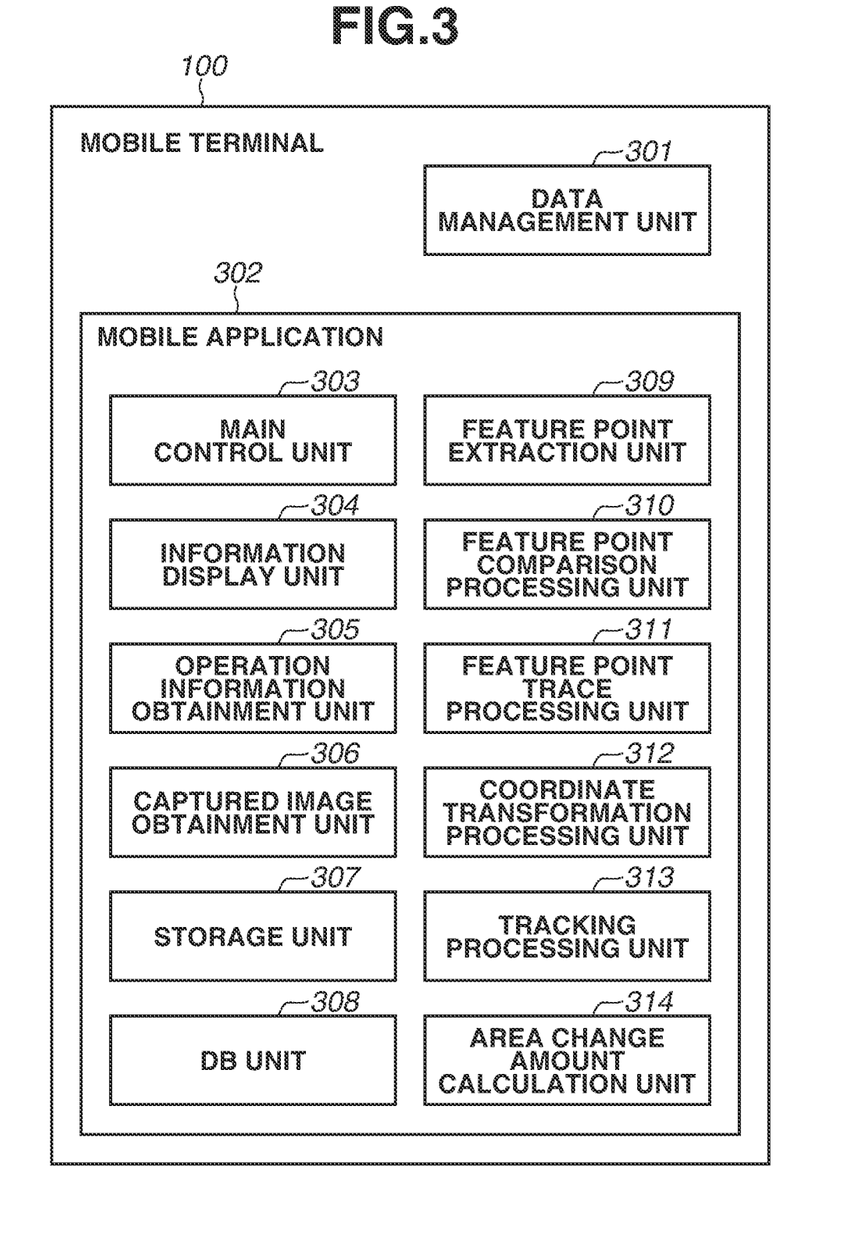
FIG. 3 illustrates an example of a software configuration of the mobile terminal.

FIG. 3 illustrates an example of a software configuration of the mobile terminal 100. A program for realizing each function processing unit of the mobile application (each module unit of the mobile application) illustrated in FIG. 3 is stored in the ROM 203 and the like. An operation system (OS) (not illustrated) of the mobile terminal 100 includes a data management unit 301.

The data management unit 301 manages an image and application data. The OS provides a control application programming interface (API) for using the data management unit 301. The mobile application uses the control API to obtain and store the image and the application data managed by the data management unit 301.

A mobile application 302 is an application downloaded and installed from an application store and the like of each OS using an installation function of the OS of the mobile terminal 100. The mobile application 302 performs various data processing on the image of the object 105 obtained via the camera unit 206.

A main control unit 303 is a control unit for controlling each module unit (304 to 314) constituting the application (mobile application) 302 for the mobile terminal 100 in cooperation with each other.

Figure 4:
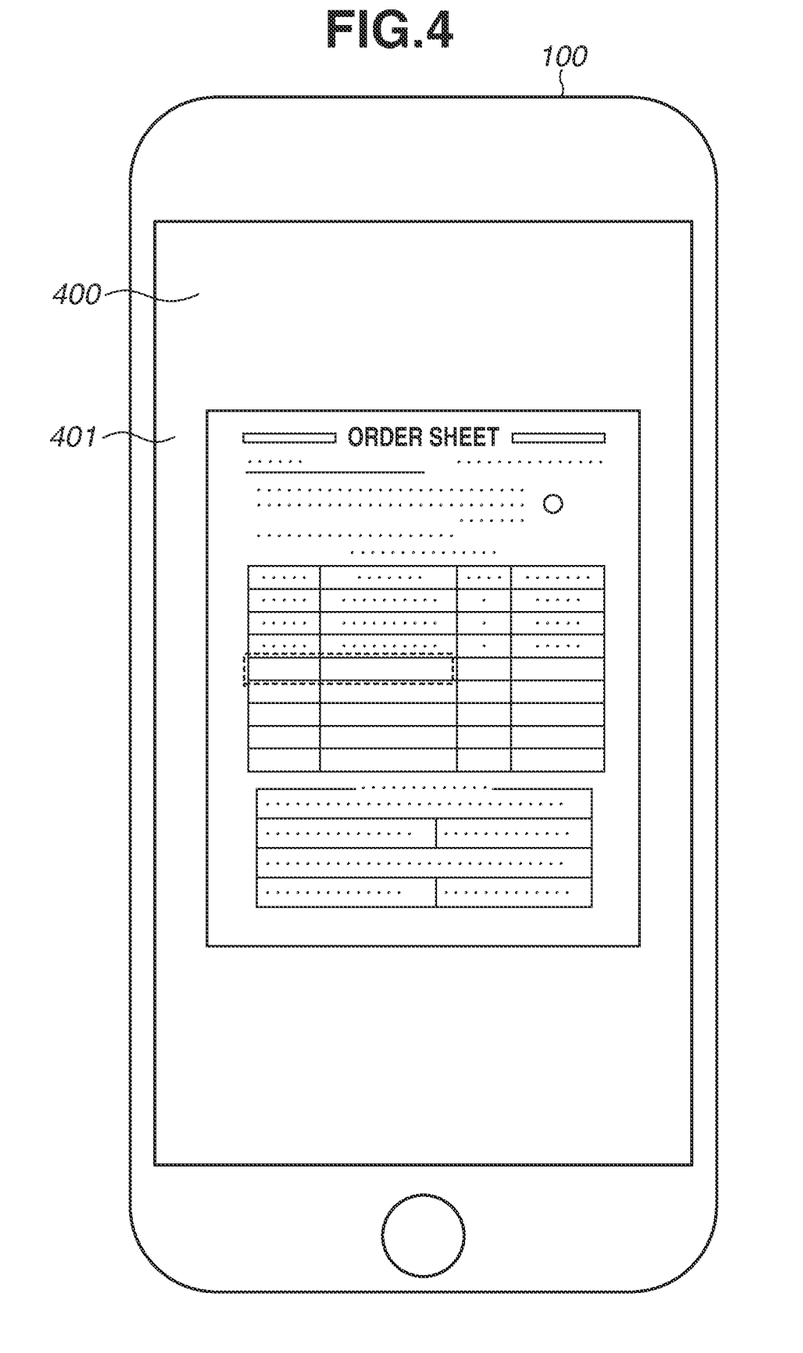
FIG. 4 illustrates an example of a user interface (UI) of a mobile application.

An information display unit 304 displays a user interface (UI) of the mobile application 302 on a screen and provides the UI to a user according to an instruction from the main control unit 303. FIG. 4 illustrates an example of a screen (a mobile terminal screen 400) for providing the UI of the mobile application 302 (the UI for the mobile terminal). The mobile terminal screen 400 is displayed on the touch panel 102 of the mobile terminal 100. Further, in the mobile terminal screen 400, an image obtained via the camera 104 is displayed on an area 401 for displaying and performing an operation, and an operation performed by a user (a user operation) on an image and the like is received via the displayed UI. A configuration (a position, a size, a range, an arrangement, a display content, and the like) of the UI of the mobile application 302 is not limited to the one illustrated in the drawings, and an appropriate configuration can be adopted which can realize various processing described below.

An operation information obtainment unit 305 obtains information indicating a content of a user operation performed via the UI displayed by the information display unit 304 and notifies the main control unit 303 of the obtained information. For example, when a user touches the area 401 with his/her hand, the operation information obtainment unit 305 detects information of a touched position on the screen and transmits the information of the detected position to the main control unit 303.

A captured image obtainment unit 306 obtains each captured image such as a moving image captured via the camera unit 206 and transmits the image to a storage unit 307. The storage unit 307 stores the captured image obtained by the captured image obtainment unit 306. In addition, the storage unit 307 can delete the stored captured image according to an instruction of the main control unit 303.

Figure 5:
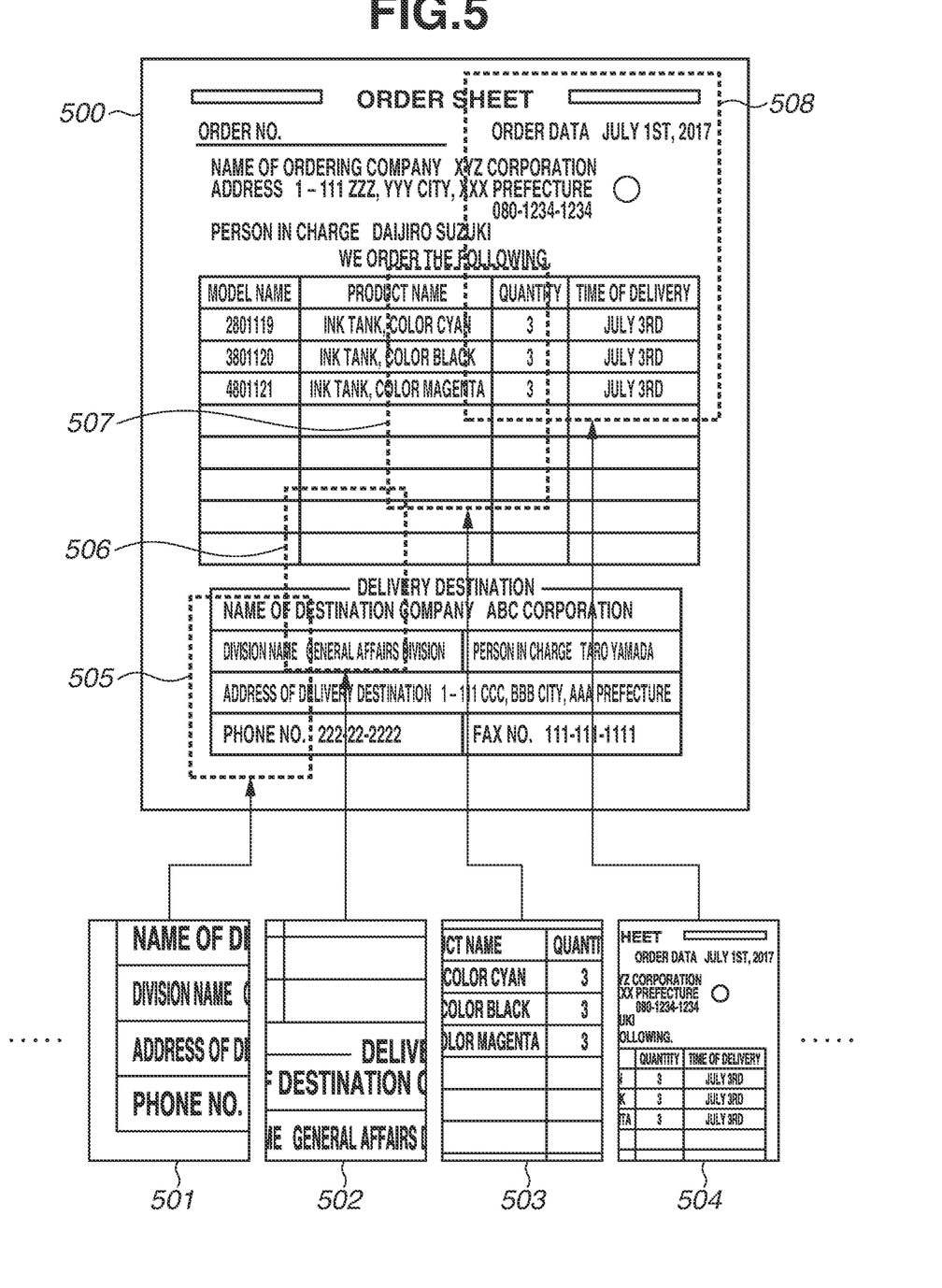
FIG. 5 illustrates an example of an entire image and captured images.
Figure 6:
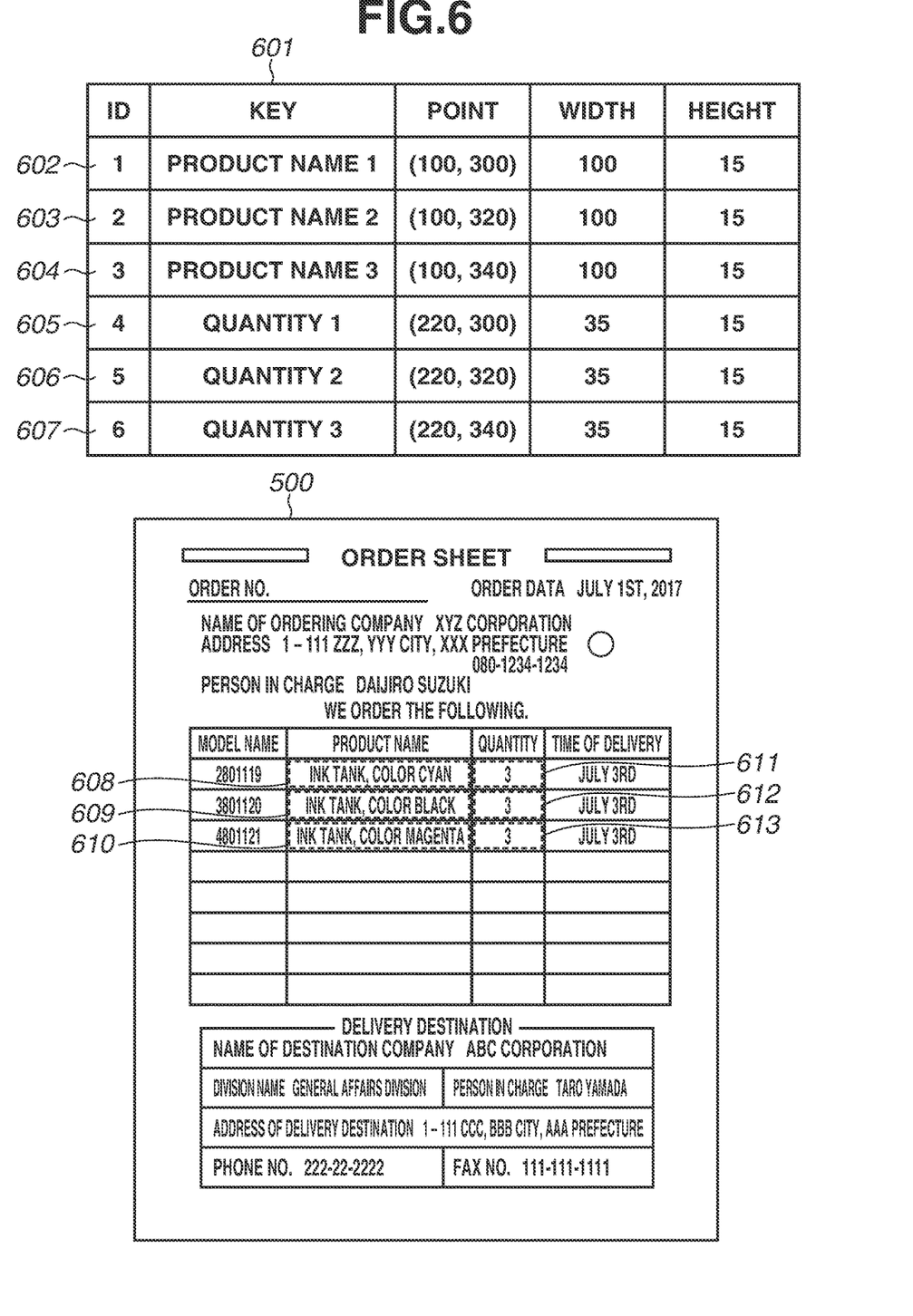
FIG. 6 illustrates an example of a data input area information table and information regarding the data input area.

A database (DB) unit 308 has a database function and manages an entire image 500 described below and information indicating a position of a data input area (an OCR target area) in which data information to be extracted is described in the entire image 500 in a data input area information table 601 and the like. Data in the DB unit 308 is transmitted to the storage unit 307 when the mobile application 302 is started by the main control unit 303 and obtained according to an instruction of the main control unit 303 when required.

A feature point extraction unit 309 regards a portion (an edge) in which brightness of an image is largely changed in an image captured via the camera unit 206 as a characteristic pixel point (a feature point) and calculates data (a feature amount) indicating the feature of the feature point. Methods for calculating a feature point and its feature amount include scale-invariant feature transform (SIFT) and speeded-up robust features (SURF). The methods for calculating a feature point and its feature amount are not limited to the above-described methods, however, a method is preferable which is robust to changes such as rotation, magnification, reduction, and movement of an image and capable of uniquely determining a matching feature point in feature point comparison processing described below.

A feature point comparison processing unit 310 performs feature point comparison processing for comparing feature points respectively extracted from two different images by the feature point extraction unit 309. The feature point comparison processing compares feature points and feature amounts between the respective images and thus can determine (perform matching of) a combination of feature points matching with each other between the images. In addition, a method such as random sample consensus (RANSAC) for estimating regularity by excluding outliers is used, and thus matching can be performed more accurately by excluding a combination of feature points acting as noise. Feature point comparison processing is a matching method with high accuracy, but is generally slow in processing speed. According to the present exemplary embodiment, feature point comparison processing is performed between an entire image of a document (a business form etc.) in a known format prepared in advance and a captured image captured by the camera unit 206.

A feature point trace processing unit 311 performs feature point trace processing (an optical flow) in which a feature point is extracted from a captured image in a first frame (an original image) in a captured moving image by the feature point extraction unit 309, and a moved position of the feature point is estimated on a captured image in a second frame as a comparison target. The feature point trace processing estimates a motion vector indicating which direction and how far each feature point in the original image moves in the comparison target image. Accordingly, it can be estimated that which position on the comparison target image the feature point on the original image moves to. A processing speed of the feature point trace processing by the feature point trace processing unit 311 is faster than that of the feature point comparison processing by the feature point comparison processing unit 310. However, in order to accurately calculate a motion vector in the feature point trace processing, a moving amount of the object is less than or equal to a certain value (a difference between images is small) between two images (the captured image in the first frame and the captured image in the second frame).

A coordinate transformation processing unit 312 calculates a homography transformation matrix (hereinbelow, referred to as a transformation matrix) for performing homography transform between two images (the entire image and the captured image, or the captured image in the first frame and the captured image in the second frame) and thus performs mapping of points. The homography transform can transform and shift a point on a certain plane coordinate system to a different plane coordinate system. Affine transformation for performing rotation, parallel translation, magnification, and reduction of an image is similar to the homography transform, however, the homography transform can perform trapezoid transformation by changing a magnification and reduction ratio according to a coordinate position in addition thereto. The homography transform is expressed as follows using a coordinate point (x1, y1) on a transformation source image, a coordinate point (x2, y2) on a transformed image, a transformation matrix H, and a constant S. The equation of the transformation matrix is not limited to the expression in the below-described equation (a determinant) and may be in other forms as long as it is a transformation equation for transform coordinate systems of two images. Such a transformation equation (transformation matrix) is used as transformation information when coordinate systems of two images are transformed.

$$H\begin{pmatrix} x_1 \\ y_1 \\ 1 \end{pmatrix} = \begin{pmatrix} h_{11} & h_{12} & h_{13} \\ h_{21} & h_{22} & h_{23} \\ h_{31} & h_{32} & 1 \end{pmatrix}\begin{pmatrix} x_1 \\ y_1 \\ 1 \end{pmatrix} = \begin{pmatrix} s \cdot x_2 \\ s \cdot y_2 \\ s \end{pmatrix} \quad \text{[Equation 1]}$$

When two images include feature points extracted from the same object, a parameter of the transformation matrix H is calculated based on coordinates of corresponding points between the images calculated by matching processing by the feature point comparison processing unit 310 or the feature point trace processing unit 311. Accordingly, coordinates in a first image can be mapped in a second image by calculating a transformation matrix between the two images, and mapping can be inversely performed by calculating in an inverse matrix of the transformation matrix. However, when two images include very few same object (when a difference between the images is large), the number of feature points successful in matching is decreased, and calculation of the transformation matrix H fails.

A tracking processing unit 313 performs tracking processing described below to track which portion (area) in the entire image 500 is captured in a latest captured image by the camera 104. Further, the tracking processing unit 313 maps and draws the data input area on the captured image based on the tracking result and information of the data input area stored in the data input area information table 601 and displays the data input area on the mobile terminal screen 400. Thus, once the latest captured image is obtained, the present exemplary embodiment waits for processing for calculating the transformation matrix between the entire image 500 and the latest captured image by the coordinate transformation processing unit 312, and thereafter an image in which the data input area is mapped is displayed on the mobile terminal screen 400. Calculation of the transformation matrix by the coordinate transformation processing unit 312 uses matching processing of feature points between the two images, and the matching processing includes two calculation methods by the feature point comparison processing unit 310 and the feature point trace processing unit 311. The matching processing by the feature point comparison processing unit 310 takes a time, and an image capturing rate may be reduced if drawing is not perform until the feature point comparison processing is completed. The feature point trace processing by the feature point trace processing 311 is performed at high speed, however, tracking is performed by sequentially multiplying transformation matrices calculated between each of captured frames, and thus errors of the transformation matrices calculated between each of the captured frames are accumulated. If only the feature point trace processing by the feature point trace processing 311 is performed, tracking results are gradually deviated. Thus, in the tracking processing described below, the feature point comparison processing and the feature point trace processing are used in combination, and accordingly, tracking deviation is minimized, and the image capturing rate in drawing on the mobile terminal screen 400 is prevented from being reduced.

An area change amount calculation unit 314 calculates differences in distances and areas when the consecutive captured images are each mapped on an entire image plane coordinate system based on tracking results by the tracking processing unit 313. A distance between respective areas is a distance in a straight line between center points in the respective areas (an area of the captured image when the captured image is mapped on the entire image plane coordinate system is a rectangle, so that the center point is a center of four vertices of the rectangle).

Next, the entire image and the captured image are described with reference to FIG. 5. The entire image 500 is an example of a document image prepared in advance. The entire image 500 is image data regarding an entire image of the object 105 and stored in the DB unit 308 in advance, however, not limited to this. For example, a flow for obtaining the entire image 500 by performing shaping and processing thereon such as sheet surface detection processing for deleting an area other than an object and distortion correction processing for correcting a distortion portion based on image data obtained by initially capturing an entire image of the object 105 may be added to the mobile application 302. The entire image 500 may be a document image of a known format including only a table frame and a fixed character string portion (an image before a character string is written in the data input area).

An image in each frame of a moving image obtained by capturing a part (or a whole) of the object 105 with the camera 104 is referred to as a captured image. Captured images 501, 502, 503, and 504 are examples of captured images in each of frames extracted from a captured moving image. Further, image capturing areas 505, 506, 507, and 508 indicate image capturing areas corresponding to the captured images 501 to 504 in the entire image 500. In other word, FIG. 5 illustrates that the image capturing area is moved from the area 505 to the area 508 in response to the movement of the camera 104.

Next, a data input area information table stored in the DB unit 308 is described. FIG. 6 illustrates an example of a data structure of the data input area information table and information regarding the data input area (an OCR processing target area) stored in the table according to the present exemplary embodiment. The data input area information table 601 is constituted of an id column, a key column, a point column, a width column, and a height column. The id column is a value incremented by one every time a record is added to the data input area information table 601 and a primary key in the table. The key column stores information indicating what information each record is the data input area information related to. The point column stores coordinates of an upper left end of the data input area in the coordinate system of the entire image 500. The width column stores information indicating a width of the data input area by a pixel unit. The height column stores information indicating a height of the data input area by a pixel unit. Areas 608 to 613 illustrated in the entire image 500 in FIG. 6 respectively indicate areas corresponding to information pieces 602 to 607 of the data input areas in the data input area information table 601.

Next, tracking processing by the tracking processing unit 313 is described with reference to FIG. 7. Transformation information used for coordinate transformation between two images is described below as "transformation matrix", however, the transformation information is not limited to expression of the determinant as described above regarding the coordinate transformation processing unit 312 and may be other transformation equations (other transformation information pieces). Captured images 700 to 708 are captured images in consecutively captured moving images obtained by the captured image obtainment unit 306 which are captured by bringing the camera 104 close to the object 105. In the captured images, the captured image 700 is a captured image first obtained from a start time point of the image capturing. A first transformation matrix 709 is a transformation matrix calculated by the coordinate transformation processing unit 312 using a feature point comparison result obtained by the feature point comparison processing unit 310 using the entire image 500 prepared in advance and the captured image 700 as inputs. The processing by the feature point comparison processing unit 310 takes a time, and the captured images 701 and 702 are obtained as images in each frame of the moving image before the first transformation matrix 709 is calculated. At this time, a position of the data input area cannot be determined since the first transformation matrix is not yet generated, so that the captured images 701 and 702 are displayed on the mobile terminal screen 400 as they are.

Figure 7:
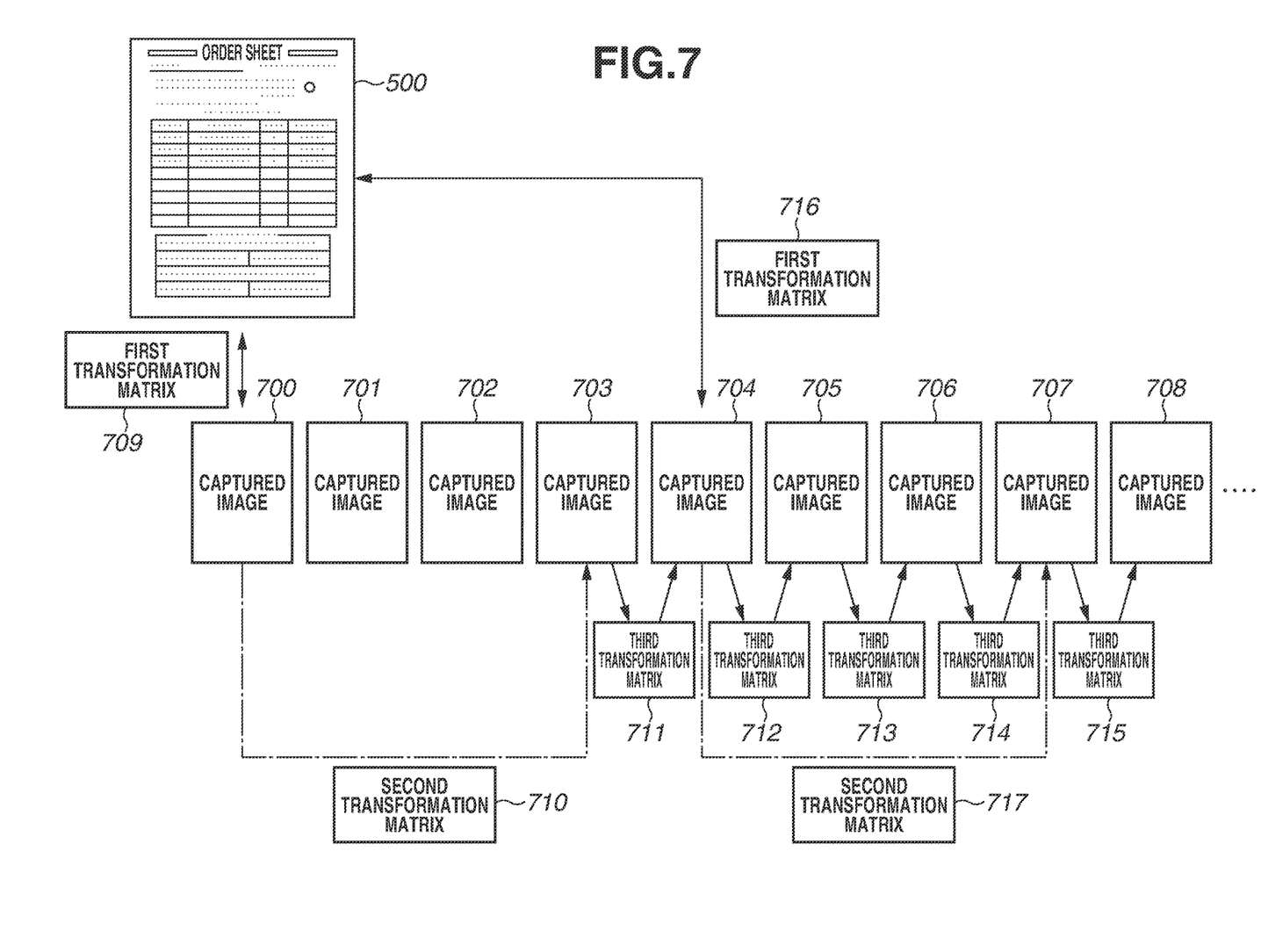
FIG. 7 illustrates an example of tracking processing.

In the example in FIG. 7, calculation of the first transformation matrix 709 by the coordinate transformation processing unit 312 is finished at a timing when the captured image 703 is obtained, and the first transformation matrix 709 is obtained. At that timing, a second transformation matrix 710 is generated. The second transformation matrix 710 is calculated by the coordinate transformation processing unit 312 using an execution result of the feature point trace processing for tracing the feature point by the feature point trace processing unit 311 using the captured image 700 used for the calculation of the first transformation matrix 709 and the latest captured image 703 as input images. Further, a transformation matrix which enables transformation of coordinates between the entire image 500 and the captured image 703 is calculated by multiplying the first transformation matrix 709 and the second transformation matrix 710. Each data input area is mapped and drawn on the captured image 703 based on the calculated transformation matrix and the data input area information stored in the data input area information table 601 and displayed on the mobile terminal screen 400.

Subsequently, the coordinate transformation processing unit 312 calculates a third transformation matrix 711 using an execution result of the feature point trace processing for tracing the feature point by the feature point trace processing unit 311 using the latest captured image 704 and the previous captured image 703 as input images. Further, a transformation matrix which enables transformation of coordinates between the entire image 500 and the captured image 704 is calculated by multiplying the first transformation matrix 709, the second transformation matrix 710, and the third transformation matrix 711. Third transformation matrices 712 to 715 are respectively calculated between the latest captured image and the previous captured image in the similar manner. Further, a transformation matrix which enables transformation of coordinates between the entire image 500 and the latest captured image (any of the captured images 704 to 708) can be calculated by multiplying the first transformation matrix 709, the second transformation matrix 710, and one or a plurality of the third transformation matrices.

However, accuracy of the transformation matrix calculated by the coordinate transformation processing unit 312 is not 100% because of an estimation error in the feature point trace processing by the feature point trace processing unit 311, and thus errors are accumulated by multiplying a plurality of transformation matrices. Therefore, the first transformation matrix and the second transformation matrix are regularly updated to reset accumulation of the errors. A first transformation matrix 716 is a transformation matrix calculated by the coordinate transformation processing unit 312 using a feature point comparison result obtained by the feature point comparison processing unit 310 using the entire image 500 and the captured image 704 as inputs. As is the case when the first transformation matrix 709 is calculated, calculation of the first transformation matrix 716 takes a time, and the captured images 705 and 706 are obtained before the first transformation matrix 716 is calculated. In this regard, each time the captured image 705 or 706 is obtained, the third transformation matrix 712 or 713 is calculated between the previous captured image. Further, a transformation matrix can be calculated which performs transformation of coordinates between the latest captured image 706 and the entire image 500 using the first transformation matrix 709, the second transformation matrix 710, and the third transformation matrices 711, 712, and 713 which are already generated. Calculation of the first transformation matrix 716 by the coordinate transformation processing unit 312 is finished at a timing when the captured image 707 is obtained, and the first transformation matrix 716 is obtained. A second transformation matrix 717 is generated at the timing. The second transformation matrix 717 is calculated by the coordinate transformation processing unit 312 using an execution result of the feature point trace processing by the feature point trace processing unit 311 using the captured image 704 used for calculation of the first transformation matrix 716 and the latest captured image 707 as input images. Update of the first transformation matrix and the second transformation matrix is completed at a timing when the second transformation matrix 717 is calculated, and in the subsequent captured images, a transformation matrix for performing transformation of coordinates between the entire image 500 and the latest captured image 708 is calculated using the updated first transformation matrix 716, the second transformation matrix 717, and the third transformation matrix 715 between each of the captured images. Since the first transformation matrix and the second transformation matrix are updated, the third transformation matrices 711 to 714 are not necessary for tracking of the latest captured image, and thus errors generated by multiplying these third transformation matrices are reset. As described above, the first transformation matrix and the second transformation matrix are regularly updated, and accordingly an error during tracking can be maintained in a minimum value.

<Basic Flow>

Figure 8:
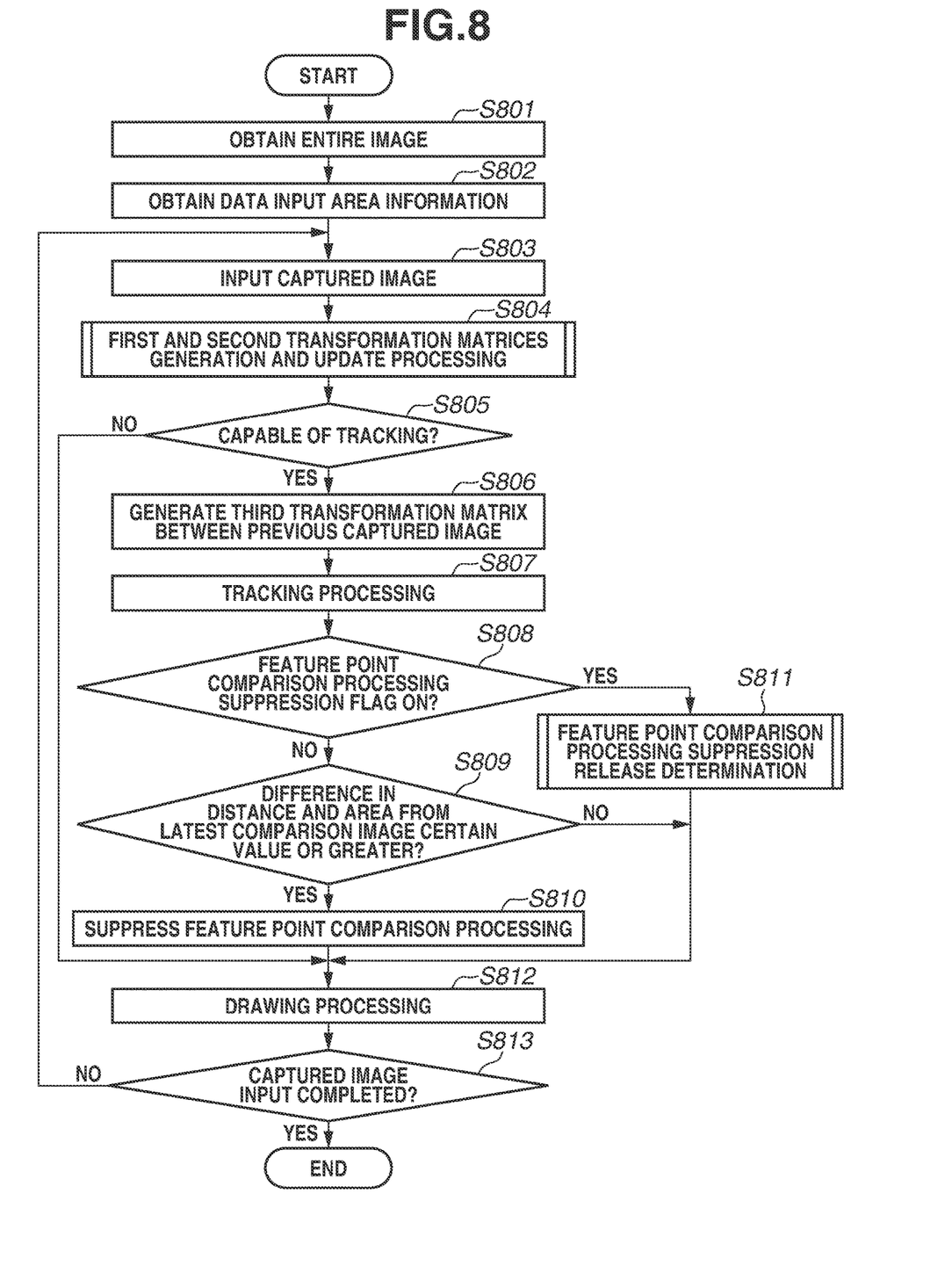
FIG. 8 illustrates a basic processing flow.

Next, a basic tracking processing flow according to the present invention which is realized by the CPU 201 of the mobile terminal 100 executing the mobile application 302 is described with reference to FIG. 8. The present flow is started by an action of a user starting the mobile application 302 in the mobile terminal 100 and capturing an image by bringing the camera 104 close to the object 105 as a trigger.

In step S801, the main control unit 303 transmits the entire image 500 stored in the DB unit 308 to the storage unit 307 so as to be available.

In step S802, the main control unit 303 transmits the data input area information table 601 stored in the DB unit 308 to the storage unit 307 so as to be available.

In step S803, the main control unit 303 issues an instruction to obtain one image in a latest frame of a moving image as a captured image from the captured image obtainment unit 306.

In step S804, the main control unit 303 executes a generation and update processing flow of the first transformation matrix and the second transformation matrix described below and generates and updates the first and the second transformation matrices.

In step S805, when generation of the first and the second transformation matrices in step S804 is completed, the main control unit 303 determines that tracking can be performed (YES in step S805) and advances the processing to step S806. On the other hand, when generation of the first and the second transformation matrices is not completed, the main control unit 303 determines that tracking cannot be performed (NO in step S805) and advances the processing to step S812.

In step S806, the main control unit 303 instructs the feature point trace processing unit 311 to perform the feature point trace processing between the input latest captured image input and the immediately previous input captured image and further instructs the coordinate transformation processing unit 312 to generate the third transformation matrix based on a result of the feature point trace processing. The coordinate transformation processing unit 312 generates the third transformation matrix based on coordinates of a plurality of feature points associated between the latest captured image as a comparison target and the immediately previous captured image by the feature point comparison processing unit 310.

In step S807, the main control unit 303 instructs the coordinate transformation processing unit 312 to generate a transformation matrix which enables transformation of coordinates between the entire image and the latest captured image using the generated first, second, and third transformation matrices.

In step S808, the main control unit 303 checks a current feature point comparison processing suppression flag, advances the processing to step S811 when the feature point comparison processing suppression flag is already on (YES in step S808) and advances the processing to step S809 otherwise (NO in step S808).

In step S809, the main control unit 303 instructs the area change amount calculation unit 314 to discriminate the image capturing area in the entire image coordinate system of the latest captured image and the image capturing area in the entire image coordinate system of the immediately previous captured image by a difference (a change amount) therebetween. When the difference (the change amount of the image capturing area) is a predetermined threshold value or greater (in other words, the camera of the mobile terminal is moved a predetermined distance or more) (YES in step S809), the main control unit 303 advances the processing to step S810. Whereas when the difference is not the predetermined threshold value or greater (NO in step S809), the main control unit 303 advances the processing to step S812.

In step S810, the main control unit 303 turns ON the feature point comparison processing suppression flag for suppressing the feature point comparison processing. The feature point comparison processing suppression flag is used in the first and the second transformation matrices generation and update step in step S804 and the determination step in step S808. As described above, when the camera of the mobile terminal is largely moved the predetermined distance or more (in other words, when the camera is unstable), the feature point comparison processing is suppressed so as not to generate and update the first transformation matrix and the second transformation matrix.

In step S811, the main control unit 303 executes a feature point comparison processing suppression release determination flow, which is described below, and controls whether to keep the feature point comparison processing suppression flag ON or to shift the feature point comparison processing suppression flag to an OFF state (change to OFF).

In step S812, the main control unit 303 maps the data input area (the OCR processing target area) on the entire image coordinate system stored in the data input area information table 601 on the captured image using the transformation matrix generated based on the first to the third transformation matrices in step S807 and the information in the data input area information table 601 stored in the storage unit 307 and displays the data input area as a guide on the screen 400 of the mobile terminal 100. In the case that the processing flow is not via the tracking processing in step S807 after the input of the captured image, the captured image on which the data input area is not mapped is displayed as it is on the mobile terminal screen 400.

In step S813, the main control unit 303 determines whether input of the captured image by the captured image obtainment unit 306 is completed. When input of the captured image is completed (YES in step S813), the flow is terminated. When input of the captured image is continued (NO in step S813), the processing is returned to step S803, and the flow is continued.

<Detail Flow of First and Second Transformation Matrices Generation and Update Processing in Step S804>

Figure 9:
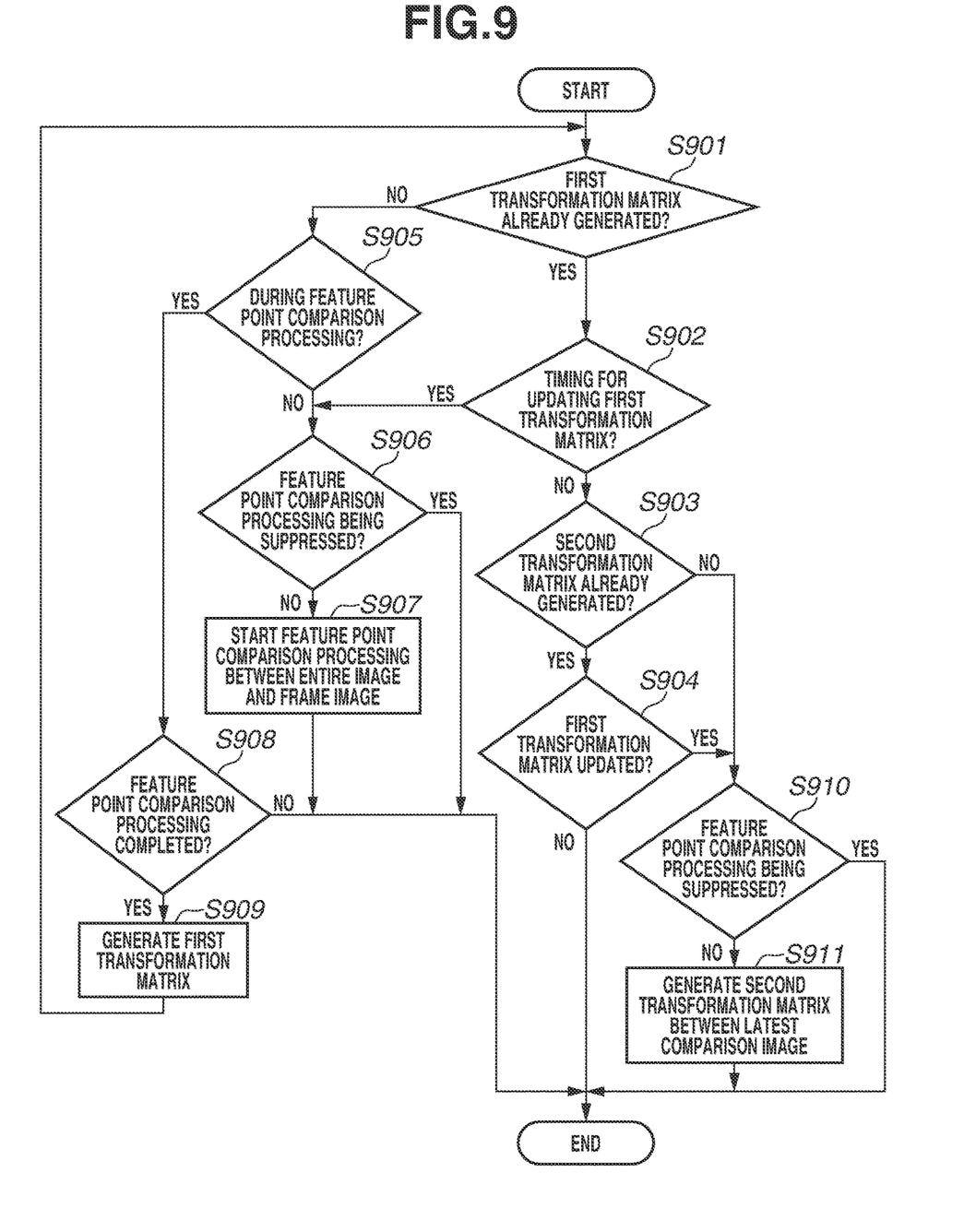
FIG. 9 illustrates a first and second transformation matrices generation and update flow.

Next, the first and second transformation matrices generation and update processing in step S804 is described in detail with reference to FIG. 9.

In step S901, the main control unit 303 determines whether the first transformation matrix is already generated. When the first transformation matrix is already generated (YES in step S901), the processing proceeds to step S902. When the first transformation matrix is not yet generated (NO in step S901), the processing proceeds to step S905. In the case in which it is determined as a timing for updating the first transformation matrix in step S902, the feature point comparison processing is started in step S907, and the first transformation matrix is not updated, which are described below, the main control unit 303 determines, in step S901, that the first transformation matrix for updating is not yet generated (NO in step S901) and advances the processing to step S905.

In step S902, the main control unit 303 determines whether it is a timing for newly updating the first transformation matrix. Regarding an update timing of the first transformation matrix, update may be performed with respect to the latest captured image at a timing when the first transformation matrix and the second transformation matrix are already generated and a tracking route is established between the entire image and the latest captured image and may be performed by capturing several frames after establishing the tracking route. In any case, the main control unit 303 determines to regularly update the first transformation matrix. When it is determined as not a timing for newly updating the first transformation matrix (NO in step S902), the processing proceeds to step S903, and when it is determined as a timing for newly updating the first transformation matrix (YES in step S902), the processing proceeds to step S906.

In step S903, the main control unit 303 determines whether the second transformation matrix is already generated. When the second transformation matrix is already generated (YES in step S903), the processing proceeds to step S904. When the second transformation matrix is not yet generated (NO in step S903), the processing proceeds to step S910.

In step S904, the main control unit 303 determines whether the first transformation matrix is updated. When the first transformation matrix is updated (YES in step S904), the processing proceeds to step S910. When the first transformation matrix is not updated (NO in step S904), the flow is terminated.

In step S905, the main control unit 303 determines whether the feature point comparison processing is being executed by the feature point comparison processing unit 310. When the feature point comparison processing is not being executed (NO in step S905), the processing proceeds to step S906. When the feature point comparison processing is being executed (YES in step S905), the processing proceeds to step S908.

In step S906, the main control unit 303 determines whether the feature point comparison processing suppression flag is ON. When the feature point comparison processing suppression flag is not ON (NO in step S906), the processing proceeds to step S907. When the feature point comparison processing suppression flag is ON (YES in step S906), the flow is terminated.

In step S907, the main control unit 303 instructs the feature point comparison processing unit 310 to start the feature point comparison processing between the entire image and the latest captured image and terminates the flow.

In step S908, the main control unit 303 determines whether the feature point comparison processing by the feature point comparison processing unit 310 is completed. When the processing is completed (YES in step S908), the processing proceeds to step S909. When the processing is not completed (NO in step S908), the flow is terminated.

In step S909, the main control unit 303 instructs the coordinate transformation processing unit 312 to generate the first transformation matrix between the entire image and the captured image as the targets of the relevant feature point comparison processing using the result of the feature point comparison processing by the feature point comparison processing unit 310. The coordinate transformation processing unit 312 generates the first transformation matrix based on coordinates of a plurality of feature points in the entire image and coordinates of a plurality of feature points in the captured image as the comparison target associated with each other by the feature point comparison processing unit 310. When the generated first transformation matrix is the first transformation matrix for updating, the coordinate transformation processing unit 312 also performs update processing of the first transformation matrix. When generation and update of the first transformation matrix are completed, the processing proceeds to step S901, and the flow is continued.

In step S910, the main control unit 303 determines whether the feature point comparison processing suppression flag is ON. When the suppression flag is not ON (NO in step S910), the processing proceeds to step S911. When the suppression flag is ON (YES in step S910), the flow is terminated.

In step S911, the main control unit 303 instructs the feature point trace processing unit 311 to perform the feature point trace processing between the captured image (the feature point comparison image) used for calculation of the first transformation matrix and the latest captured image and further instructs the coordinate transformation processing unit 312 to calculate the second transformation matrix based on the result of the feature point trace processing. When generation of the second transformation matrix is completed, the flow is terminated.

<Detail Flow of Feature Point Comparison Processing Suppression Release Determination Processing in Step S811>

Next, a detail flow of feature point comparison processing suppression release determination processing in step S811 is described with reference to FIG. 10.

In step S1001, the main control unit 303 instructs the area change amount calculation unit 314 to obtain differences in distances and areas between captured images previous and subsequent to captured images in a plurality of consecutive frames obtained from the captured image obtainment unit 306. The number of captured images to be obtained in step S1001 is a preliminarily determined number which is sufficient to determine that an operation of the mobile terminal 100 is stable.

In step S1002, the main control unit 303 determines whether the differences between the captured images obtained in step S1001 are consecutively a predetermined threshold value or less for a predetermined number of frames. When it is determined that the differences are the predetermined threshold value or less (YES in step S1002), the processing proceeds to step S1003, and otherwise, the flow is terminated.

In step S1003, the main control unit 303 releases the feature point comparison processing suppression flag (turns the flag OFF).

In step S1004, the main control unit 303 instructs the area change amount calculation unit 314 to calculate differences in a distance and an area between the captured image (the feature point comparison image) used for generation of the immediately previous first transformation matrix and the latest captured image. When the obtained differences are a predetermined threshold value or less (YES in step S1004), the processing proceeds to step S1005, and otherwise, the flow is terminated.

In step S1005, the main control unit 303 instructs the coordinate transformation processing unit 312 to generate the second transformation matrix between the captured image (the feature point comparison image) used for generation of the immediately previous first transformation matrix and the latest captured image and to update the second transformation matrix. When generation of the second transformation matrix is completed, the flow is terminated. According to the processing in steps S1004 to S1005, in the case in which the latest captured image at the time point when suppression of the feature point comparison processing is released is on a position close to the captured image used for generation of the first transformation matrix before the feature point comparison processing is suppressed, the second transformation matrix can be obtained using the already generated first transformation matrix without generating the first transformation matrix again. Further, the data input area can be mapped in step S812 using the first transformation matrix and the second transformation matrix.

Figure 10:
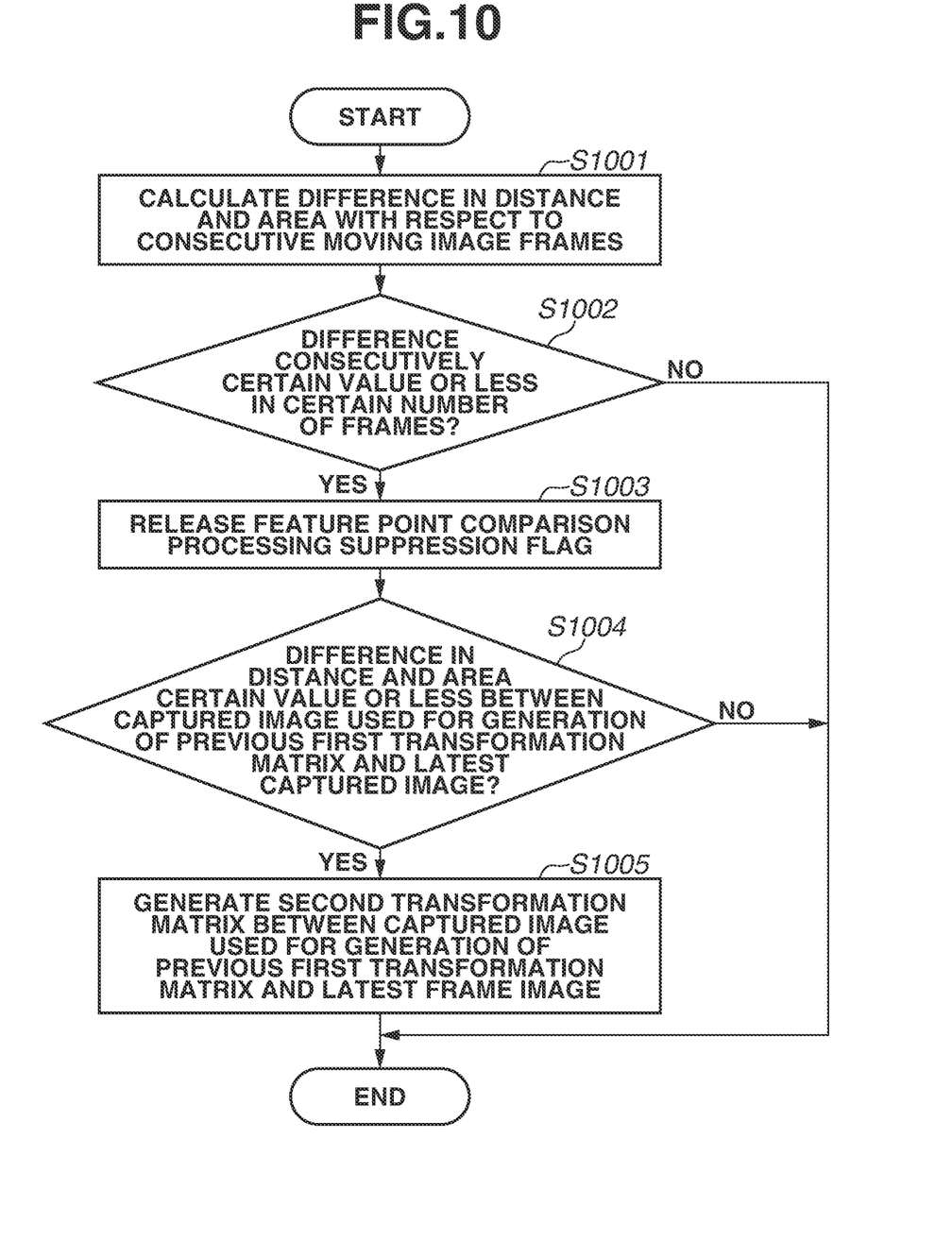
FIG. 10 illustrates a feature point comparison processing suppression release determination flow.

The processing in step S1005 in FIG. 10 provides an effect of eliminating a need to generate the first transformation matrix again, however, the processing is not a configuration essential for the present invention, and the processing in steps S1004 and S1005 may be omitted. In this case, the processing in FIG. 10 is terminated as it is after releasing the feature point comparison processing suppression flag in step S1003, and then, both of the first transformation matrix and the second transformation matrix will be the update targets when the processing proceeds to the update processing in step S804 in the processing flow in FIG. 8.

According to the present exemplary embodiment, when the camera of the mobile terminal is largely moved the predetermined distance or more (when the camera is unstable), the feature point comparison processing is suppressed so as not to update the first transformation matrix and the second transformation matrix as described with reference to FIGS. 8 to 10. Accordingly, the feature point trace processing can be continuously executed. Further, the first transformation matrix and the second transformation matrix are updated when the camera is not largely moved, accumulation of errors in feature point tracing can be resolved.

According to the information processing apparatus of the present invention, tracking processing can be improved in images being captured in moving images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-128037, filed Jun. 29, 2017, which is hereby incorporated by reference herein in its entirety.

What is claimed is:

1. An information processing apparatus comprising:
a memory that stores instructions; and
a processor that executes the instructions to perform:
feature point comparison processing for comparing a feature point extracted from an entire image prepared in advance and a feature point extracted from a first captured image, and calculating first transformation information used for coordinate transformation between a coordinate system of the entire image and a coordinate system of the first captured image;
feature point trace processing for tracing a position of a feature point in a second captured image when the first transformation information is calculated based on the feature point extracted from the first captured image, and calculating second transformation information used for coordinate transformation between the coordinate system of the first captured image and a coordinate system of the second captured image;
feature point trace processing for tracing a position of a feature point in a third captured image based on a feature point extracted from a captured image immediately previous to the third captured image, and calculating third transformation information used for coordinate transformation between a coordinate system of the immediately previous captured image and a coordinate system of the third captured image;
mapping a data input area in the entire image on the third captured image based on the first transformation information, the second transformation information, and the third transformation information; and
control to suppress update of the calculated first transformation information and update of the calculated second transformation information in a case where a change amount of a captured image is greater than a predetermined threshold value.

2. The information processing apparatus according to claim 1, wherein the control is further performed to release the suppression in a case where a change amount of the captured image is less than or equal to the predetermined threshold value.

3. The information processing apparatus according to claim 2, wherein, in a case where the suppression is released, the control is further performed to determine whether a change amount between the first captured image used for calculating the immediately previous first transformation information and a captured image at a timing when the suppression is released is less than or equal to a predetermined threshold value, and in a case where it is determined that the change amount is less than or equal to the predetermined threshold value, the control is further performed to execute feature point trace processing for tracing a position of a feature point in the captured image at the timing when the suppression is released based on the feature point extracted from the first captured image and to calculate and update second transformation information used for coordinate transformation between the coordinate system of the first captured image and a coordinate system of the captured image at the timing when the suppression is released.

4. A non-transitory storage medium on which is stored a computer program for causing a computer to perform:
feature point comparison processing for comparing a feature point extracted from an entire image prepared in advance and a feature point extracted from a first captured image, and calculating first transformation information used for coordinate transformation between a coordinate system of the entire image and a coordinate system of the first captured image;
feature point trace processing for tracing a position of a feature point in a second captured image when the first transformation information is calculated based on the feature point extracted from the first captured image, and calculating second transformation information used for coordinate transformation between the coordinate system of the first captured image and a coordinate system of the second captured image;
feature point trace processing for tracing a position of a feature point in a third captured image based on a feature point extracted from a captured image immediately previous to the third captured image, and calculating third transformation information used for coordinate transformation between a coordinate system of the immediately previous captured image and a coordinate system of the third captured image;
mapping a data input area in the entire image on the third captured image based on the first transformation information, the second transformation information, and the third transformation information; and
control to suppress update of the calculated first transformation information and update of the calculated second transformation information in a case where a change amount of a captured image is greater than a predetermined threshold value.

5. The non-transitory storage medium according to claim 4, wherein the control is further performed to release the suppression in a case where a change amount of the captured image is less than or equal to the predetermined threshold value.

6. The non-transitory storage medium according to claim 5, wherein, in a case where the suppression is released, the control is further performed to determine whether a change amount between the first captured image used for calculating the immediately previous first transformation information and a captured image at a timing when the suppression is released is less than or equal to a predetermined threshold value, and in a case where it is determined that the change amount is less than or equal to the predetermined threshold value, the control is further performed to execute feature point trace processing for tracing a position of a feature point in the captured image at the timing when the suppression is released based on the feature point extracted from the first captured image and to calculate and update second transformation information used for coordinate transformation between the coordinate system of the first captured image and a coordinate system of the captured image at the timing when the suppression is released.

7. A method for processing information, the method comprising:
performing feature point comparison processing for comparing a feature point extracted from an entire image prepared in advance and a feature point extracted from a first captured image, and calculating first transformation information used for coordinate transformation between a coordinate system of the entire image and a coordinate system of the first captured image;

performing feature point trace processing for tracing a position of a feature point in a second captured image when the first transformation information is calculated based on the feature point extracted from the first captured image, and calculating second transformation information used for coordinate transformation between the coordinate system of the first captured image and a coordinate system of the second captured image;

performing feature point trace processing for tracing a position of a feature point in a third captured image based on a feature point extracted from a captured image immediately previous to the third captured image, and calculating third transformation information used for coordinate transformation between a coordinate system of the immediately previous captured image and a coordinate system of the third captured image;

mapping a data input area in the entire image on the third captured image based on the first transformation information, the second transformation information, and the third transformation information; and performing control to suppress update of the calculated first transformation information and update of the calculated second transformation information in a case where a change amount of a captured image is greater than a predetermined threshold value.

* * * * *